Dec. 23, 1969   G. KLAPPRODT   3,484,962
SNOW CLEARING DEVICE WITH SCOOP AND BLOWER
Filed Jan. 8, 1968   2 Sheets-Sheet 1

INVENTOR
Glen Klapprodt
by Wolfe, Hubbard, Voit & Osann
ATTORNEYS

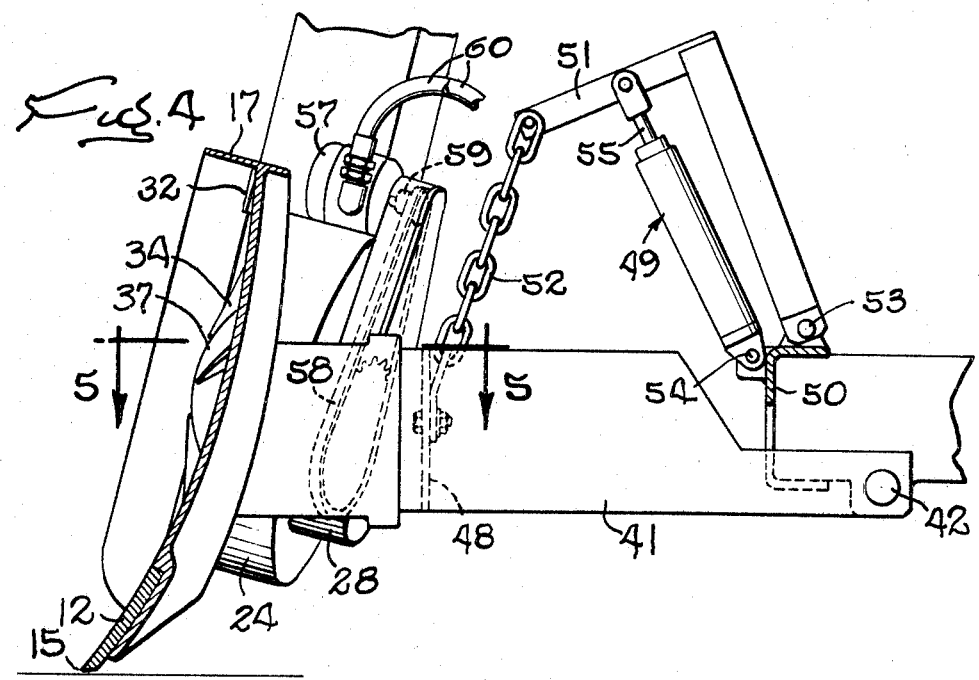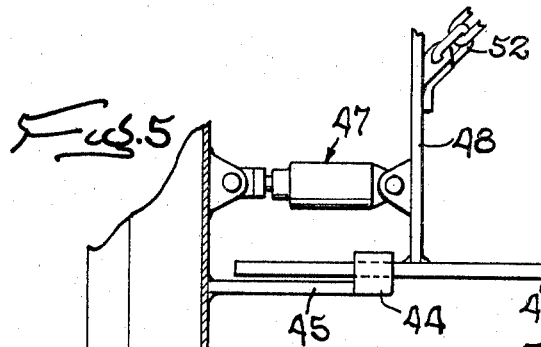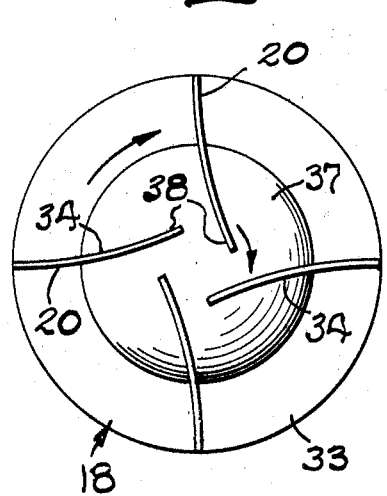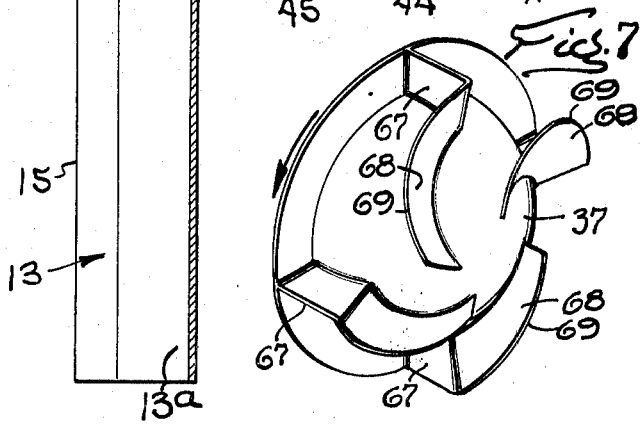

3,484,962
Patented Dec. 23, 1969

3,484,962
SNOW CLEARING DEVICE WITH SCOOP AND BLOWER
Glen Klapprodt, Mount Morris, Ill., assignor to Snow Equipment Industries, Inc., Mount Morris, Ill., a corporation of Illinois
Filed Jan. 8, 1968, Ser. No. 696,279
Int. Cl. E01h 5/07, 5/08
U.S. Cl. 37—43                10 Claims

ABSTRACT OF THE DISCLOSURE

A snow clearing device pushed by a truck and having an elongated scoop with a concavely curved front side and a blower recessed into one end portion of the scoop. The blower has radial blades rotating in a forwardly opening housing along a path that is inclined relative to the general plane of the opening in the scope so as to reach out ahead of the scoop along one side and the bottom of the opening and then move behind the scoop in moving along the opposite side. A tangential discharge spout receives the snow from the blades behind the scoop. A dome forms the hub of the blower and curved portions of the blades extend over the dome to clear the central portion of the blower and load the blower blades. The blower is powered by a motor on the blower housing behind the scoop driven by pressure fluid supplied by a pump on the truck.

BACKGROUND OF THE INVENTION

This invention relates to snow clearing devices of the type adapted to be moved along a roadway to remove snow therefrom and discharge the snow along the side of the road, and relates more particularly to snow plows of the type including an elongated blade or scoop with a lower scraping edge for scraping the road and collecting the snow on the scoop, and including a rotary blower assisting the scoop in discharging the collected snow. There have been prior blade/blower combinations, but all have been either too complex and expensive to find complete commercial acceptance or have been relatively ineffective in moving snow.

SUMMARY OF THE INVENTION

The primary object of the present invention is to incorporate a blower in a conventional snow scoop or blade in a novel manner such that the combined blade-and-blower may be simply constructed at a low and very competitive cost and, at the same time, will effectively and efficiently handle all forms of snow. More specifically, the blower is built into the scoop to receive collected snow through a forwardly facing discharge opening in the scoop, preferably at one end of the latter, and rotates in a plane generally parallel to the length of the scoop. While the blower is positioned largely behind the scoop, its blades are arranged to extend forwardly ahead of the scoop along part of their path and then to move behind the scoop along another part of the path to impel the snow out of the device. In addition, inner portions of the blades extend onto the blower hub to feed snow from the center thereof to the blades, and the entire drive mechanism is compactly mounted on the back of the scoop so that the device may be handled in the same manner as a simple plow blade.

Other objects and advantages of the invention will become apparent from the following detailed description taken in connection with the accompanying drawings.

BRIEF DESCRIPTION OF THE DRAWINGS

FIG. 4 is an enlarged fragmentary cross-sectional view taken substantially along the line 4—4 of FIG. 1 and showing the scoop and its mounting on the truck.

FIG. 5 is a fragmentary section taken along the line 5—5 of FIG. 4 showing part of the mounting of the scoop.

FIG. 6 is a front elevational view of the blower.

FIG. 7 is a perspective view of a modified form of the blower.

DESCRIPTION OF THE PREFERRED EMBODIMENT

Figure 1:
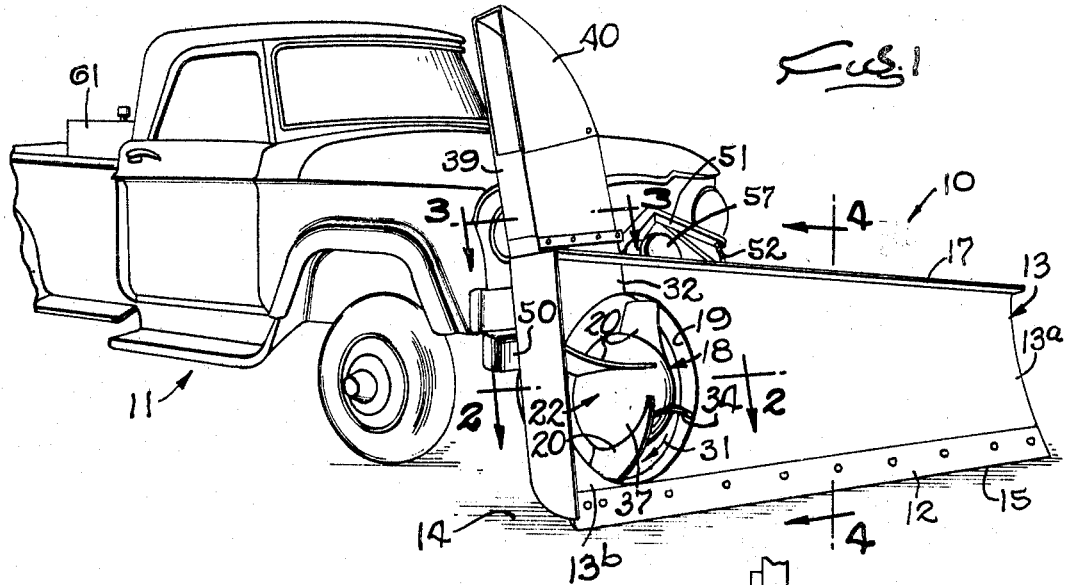
FIGURE 1 is a fragmentary front perspective view of a snow clearing device embodying the novel features of the present invention, shown in conjunction with a truck of the type that may be used to push the device.

As shown in the drawings for purposes of illustration, the invention is embodied in a combined blade-and-blower snow clearing device 10 mounted on the front of a truck 11 and adapted to be pushed by the truck along a roadway to be cleared with the lower, scraping-edge portion 12 of the elongated plow blade or scoop 13 close to or in engagement with the road 14. In the usual manner, the lower edge 15 of the scoop scrapes the road and feeds the snow onto the scoop for discharge to the side of the road.

While the plow scoop 13 itself may take various forms, it preferably is generally rectangular in shape and has a conclavely curved front side. To facilitate the discharge of snow, the scoop is inclined relative to the front of the truck 11 so that snow is fed along the scoop from the leading end 13$^a$ toward the trailing end 13$^b$ after it enters the scoop. As shown most clearly in FIGS. 1 and 4, the upper edge of the scoop preferably is formed with a forwardly projecting flange 17 overhanging the front side, and the lower, scraping-edge portion 12 is an elongated scraper plate fastened to the body of the scoop.

In accordance with the present invention, the blower 18 is incorporated in the scoop 13 in a novel manner materially contributing to the low cost and compact and simple construction of the device 10 and, at the same time, is arranged to operate with high efficiency, as compared to prior comparable blowers, thereby making it possible to move large quantities of snow with a power source of smaller size than has been required in the past. To these ends, a circular outlet opening 19 is formed in the scoop, herein adjacent the left end as viewed in FIG. 1, and the blower is mounted in this opening with one or more blades 20 rotating about an axis 21 (FIG. 2), which is offset to the plane of the scoop, while being generally perpendicular to the length of the scoop and the plane of the outlet in a generally upright plane as shown in FIG. 4. Along one side and the bottom of the outlet, the blades project outwardly beyond the front side of the scoop to bite into the collected snow, and then move back behind the scoop to discharge the snow. This novel arrangement of the blower has been found to be highly efficient in utilizing available power to discharge the snow.

Figure 2:
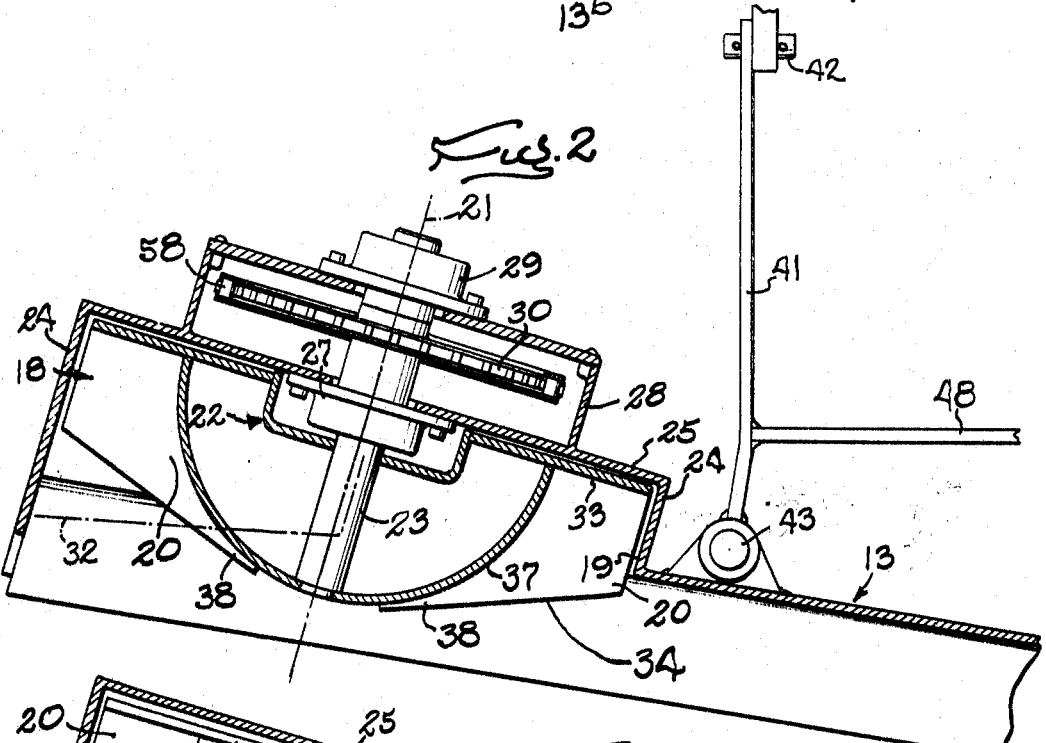
FIG. 2 is an enlarged fragmentary cross-sectional view taken substantially along the line 2—2 of FIG. 1 through the blower and one end portion of the scoop.

As shown most clearly in FIGS. 1 and 2, the blower 18 herein comprises a hollow central hub 22 fastened to the front end portion of a supporting shaft 23, with four equally spaced blower blades 20 extending radially outwardly from the hub. The blower is mounted in a cup-shaped housing having a cylindrical sidewall 24 fastened as by welding to the body of the scoop 13 around the outlet opening 19, and a flat rear wall 25 supporting a bearing 27 in which the blower shaft is journaled. The shaft extends rearwardly through this bearing and through a sprocket case 28 on the back of the housing, and is journaled in a second bearing 29 on the case. A sprocket wheel 30 fastened to the portion of the shaft in the case is part of the mechanism for driving the blower, the direction of rotation being clockwise as indicated by the arrow 31 in FIG. 1.

Figure 3:
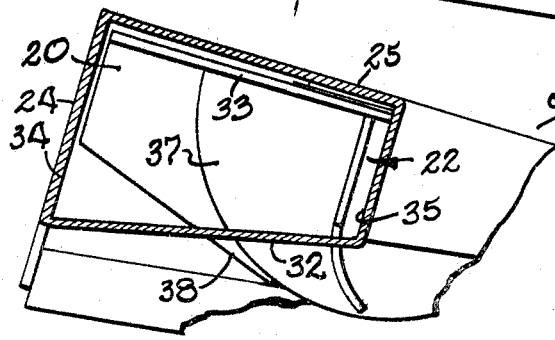
FIG. 3 is an enlarged fragmentary cross-sectional view taken substantially along the line 3—3 of FIG. 1.

To obtain the in-and-out movement of the blower blades 20 relative to the front side of the scoop 13, the housing 24, 25 is inclined progressively rearwardly to the left relative to the general plane of the scoop, that is, to the length of the scoop as indicated in cross-section in FIG. 2, so that the left side of the blower is recessed into or behind the scoop and the right side projects outwardly. In addition, the portion of the front of the scoop defining the upper left quarter of the outlet opening 19 is offset forwardly as shown at 32 in FIGS. 1–3 for clearance between the scoop and the recessed portion of the blower. Thus, in effect, this section of the front of the scoop is formed as a baffle that is inclined relative to the plane of the blower and to the main portion of the scoop.

The blower blades 20 are fastened at their rear edges to a disk 33 fast on the hub 22 and coaxial therewith, forming the back of the blower and reinforcing the blades in service use. Mounted in front of the hub 22 is a semispherical dome 37 that fills the central portion of the blower and provides a central base for the blades 20. The latter are formed with inner extensions 38 which overlie part of the dome and serve to feed snow from the dome to the main or outer portions of the blades. It will be seen in the drawings that each blade is an arcuately curved plate (see FIGS. 1 and 6) having a flat free edge (FIG. 3) closely adjacent the side wall 24 of the housing, a forwardly and inwardly inclined front edge, and an arcuate edge abutting against and fastened to the dome. The curvature of the blades is such that the inner ends are offset forwardly from the center of the dome, relative to the direction of rotation, and move edgewise into contact with snow in front of the dome to produce a shearing action. The snow sheared away onto the blades then is guided outwardly along the blades and directed radially away from the blower by the generally radial outer portions. A discharge opening 35 is formed in the sidewall 24 above the upper left quarter of the blower to receive the snow discharged from the blower.

The discharge opening 35 is formed in the cylindrical sidewall 24 of the blower housing above the upper left quarter of the blower by the lower end of a discharge spout 39 projecting upwardly from the blower housing with a hood 40 for directing the snow laterally to the left and thus to the side of the road. It will be seen in FIG. 1 that the baffle 32 forms a continuation of the lower end portion of the front side of the spout, and defines the front of the discharge opening as well as part of the outlet opening 19, which preferably is positioned with the left end of the scoop tangent to its left side, and the scraper plate 12 generally tangent to its underside.

To mount the device on the truck 11, a bracket comprising two parallel legs 41 is pivoted at 42 (see FIGS. 2, 4 and 5) on the truck with the forward ends of the bracket legs secured to the back of the scoop 13. Herein, one leg is pivoted at 43 (FIG. 2) on the back of the scoop and the other leg is slidably received in an elongated collar 44 (see FIG. 5) on an arm 45 fastened to the scoop. A hydraulic cylinder 47 acting between the scoop and a cross-piece 48 between the bracket legs is extensible and contractible to swing the scoop about the pivot 43 (FIG. 2) and thus vary the angle of the scoop relative to the truck and the load.

Raising and lowering of the scoop 13 is accomplished by a second hydraulic cylinder 49 (FIG. 4) acting between the bumper 50 of the truck and the free end portion 51 of a bell crank fastened to the cross-piece 48 by a chain 52. Due to the spacing of the pivot 53 at the lower end of the crank from the pivot 54 of the cylinder, extension of the rod 55 of the cylinder lifts the plow scoop away from the road to a transport position.

The drive mechanism for the blower 18 includes a hydraulic motor 57 mounted immediately behind the scoop 13 on top of the blower housing, and an endless chain 58 driven by a sprocket wheel 59 on the motor shaft and driving the sprocket wheel 30 on the blower shaft, all of this mechanism being compactly mounted on the back of the scoop. Flexible hoses 60 (FIG. 4) transmit pressure fluid for powering the motor from a suitable source such as a pump 61 (FIG. 1) carried on the truck. It has been found that a relatively small blower motor, for example, a 60-horsepower motor, is sufficient for an eight and one-half foot plow having a thirty-inch blower with blades on the order of ten inches wide.

In operation, the plow scoop 13 is set at the desired angle and lowered to the desired position (FIG. 4), and then is pushed along the roadway 14 in the usual manner so that the lower edge portion 12 scrapes the road and collects the snow on the scoop. It should be evident that very light snow can be handled with the scoop alone, without need for the blower. With deeper snow, however, the blower is used to assist the scoop in discharging the snow, thereby enabling the plow to move faster and also making it possible to discharge the snow farther from the road.

For this purpose, the pump 61 is activated to deliver fluid to the motor 57 at a sufficient pressure and rate to rotate the blower at high speed, driving the blades 20 clockwise along their circular path closely following the boundary of the outlet opening 19. Each blade moves to the right (FIG. 1) across the top of the outlet, downwardly along the right side into the snow accumulating on the front side of the scoop and then to the left along the bottom of the outlet and through the snow. During this portion of its motion, the forward edge of each blade picks up a quantity of snow to load the blade, which carries the snow through the outlet, near the bottom thereof, for discharge through the spout 39 at the top of the blower, tangent to the path of the blades and in the manner that is customary with rotary blowers. After discharging its load, each blade repeats its cycle. Of course, all of this is accomplished at high speed to discharge snow at a high rate through the spout.

A modified (and preferred) form of the blower is shown in FIG. 7 wherein it will be seen that the blower blades are mounted, as before, on a disk 33 and a semispherical dome 37 and have generally radial outer portions 67 with flat free edges positioned to move along the sidewall 24 of the blower housing. The central portion 68 curves arcuately inwardly over the dome, forwardly relative to the direction of rotation, and is inclined and laid over to present the edge 69 of the forward portion of the blade to the snow for a knife-like shaving action for shearing off snow and feeding it along the blade to the outer blower-portion 67 for discharge.

From the foregoing, it will be seen that the snow clearing device constituting the present invention is quite simple and compact in construction and can be manufactured at a relatively low price. In operation, however, the device is capable of handling all forms of snow, including slush and sleet, and can operate effectively in heavy snow with a relatively small power source. It is believed that this increased effectiveness is achieved by combining the recognized advantages of a blade-type plow with a blower, using all available power to drive the blower alone, and positioning the blower in the novel manner herein described for optimum efficiency of operation. Those skilled in the art will appreciate the fact that two or more such blowers may be mounted on the scoop in side-by-side relation and operated simultaneously for even greater snow handling capacity.

I claim as my invention:

1. In a snow clearing device, the combination of, an elongated scoop having an upright front side of concave curvature with a lower scraping-edge portion and adapted to be moved forwardly along a roadway to scrape the latter with the scoop inclined relative to the roadway, said scoop having a circular outlet opening in the general plane of said front side adjacent said scraping-edge portion and adjacent one end of the scoop, a cup-shaped blower housing mounted on the back of said scoop around said outlet opening to recevie snow through the opening, a blower journaled on said housing and having a plurality of blades movable along a circular path closely following the curvature of said opening, mechanism for driving said blower at high speed in one direction, said blower partially protruding beyond the general plane of the portion of the scoop defining said opening, said blower having an axis inclined relative to said general plane whereby said blades extend beyond said circular opening at a point remote from said end and behind said circular opening at a point adjacent said one end, thereby to bite into snow in front of said scoop and carry the snow behind the scoop for discharge, means defining a discharge opening leading out of said housing generally tangent to said path along the portion of the path behind said scoop, and a discharge spout for receiving snow through said discharge opening and directing the snow laterally from said roadway.

2. The combination defined in claim 1 in which said blower is formed with a hub supporting said blades, said hub having a front side covered by a dome with portions of said blades extending onto said dome for feeding snow from the central portion of said blower into the path of said blades.

3. The combination defined in claim 1 in which said housing is formed with a back wall that is inclined progressively rearwardly from the other end of the scoop toward said one end relative to said general plane, said blower having a supporting shaft journaled on and projecting through said back wall, perpendicular thereto, and said drive mechanism including a sprocket on said shaft behind said back wall, a motor beside the back of said scoop, and a chain driven by said motor and coupled to said shaft.

4. The combination defined in claim 1 in which said outlet opening is generally tangent to the top of said scraping-edge portion and to said one scoop end and is defined in part by a baffle spaced forwardly from the path of said blades adjacent said one end and forming part of said front side, said baffle being disposed above said opening at said one end and also forming the front side of the lower end of said spout.

5. In a snow clearing device, the combination of, an elongated scoop having an upright front side with a lower scraping-edge portion and adapted to be moved forwardly along a roadway to scrape snow therefrom and collect the snow on said scoop, said scoop having a circular outlet opening therein adjacent said scraping-edge portion and adjacent one end of the scoop, a rotary blower disposed in said outlet opening and having at least one blade rotatable within said opening about an axis, said blade having a free end movable along the boundary of said opening, means supporting said blower for rotation of said blade in a plane inclined rearwardly toward said one end relative to the general plane of the portion of said scoop defining said opening whereby said blade projects forwardly beyond said front side of the opening farthest from said one end and when moving along the bottom of said opening, and moves rearwardly behind said front side when moving along the lateral side of the opening closest to said one end, mechanism for driving said blower at high speed and rotating said blade in a direction about said axis to move downwardly along said farthest lateral side to collect snow and carry the snow upwardly along said closest side and behind said scoop, and means defining a discharge opening over said closest side for receiving collected snow generally tangent to said outlet opening.

6. In a snow clearing device, the combination of, an elongated scoop having an upright front side with a lower scraping-edge portion and adapted to be moved forwardly along a roadway to scrape snow therefrom and collect the snow on said scoop, said scoop having a forwardly facing outlet opening therein, a rotary blower alined with said opening and having at least one blade rotatable along a predetermined path about an axis, said blade having a forward portion projecting forwardly beyond said front side along the portion of said path extending downwardly along one lateral side of said opening and along the bottom thereof to bite into collected snow in front of said scoop, said forward portion moving rearwardly behind the front side of said scoop along the portion of said path extending upwardly along the other lateral side of said opening and across the top of the opening, means defining a discharge opening over said path for receiving snow from said blower generally tangent to the path, and mechanism for driving said blower at high speed and rotating said blade in one direction to collect snow at said outlet opening and impel the snow through said discharge opening.

7. The combination defined in claim 6 in which said blade has a generally radial outer portion and curves forwardly toward its inner end, said inner end being offset forwardly from the center of the blower to move edgewise into snow in front of the blower and shear away snow for discharge by the blade.

8. The combination defined in claim 7 in which said blower has a plurality of such blades angularly spaced apart around the blower, and further including a semi-spherical dome filling the central portion of the blower, each blade having a free edge spaced outwardly from the dome, a forward edge extending inwardly and part way across the dome and curving forwardly to said inner end, and an arcuate edge abutting against and fastened to said dome.

9. The combination defined in claim 6 in which said blower is mounted at an angle relative to the length of said scoop to offset one side of the blower forwardly from the front side of the scoop and the other side rearwardly from said front side.

10. The combination defined in claim 6 in which said blower comprises a semi-spherical dome filling the central portion of the blower, and a plurality of blades spaced angularly around the blower, each blade having a generally radial outer portion for discharging snow from the blower and a curved inner portion overlying part of said dome, said inner portions curving inwardly across said dome and forwardly relative to the direction of rotation of the blower, and being inclined and laid over to present the edges of said forward portions to the snow for a knife-like shaving action.

References Cited

UNITED STATES PATENTS 2,281,289    4/1942    Hewitt.
2,802,287    8/1957    Bevan _____ 37—43

ROBERT E. PULFREY, Primary Examiner

EUGENE H. EICKHOLT, Assistant Examiner

U.S. Cl. X.R.

37—42, 50